United States Patent [19]

Tamura et al.

[11] 4,197,366
[45] Apr. 8, 1980

[54] NON-AQUEOUS ELECTROLYTE CELLS

[75] Inventors: Kohki Tamura; Toshiki Kahara; Tatuo Horiba; Noboru Ebato, all of Hitachi, Japan

[73] Assignees: Hitachi, Ltd.; Hitachi Chemical Co., Ltd., both of Japan

[21] Appl. No.: 932,656

[22] Filed: Aug. 10, 1978

[51] Int. Cl.² .............................................. H01M 6/14
[52] U.S. Cl. .................................... 429/197; 429/224
[58] Field of Search .................... 429/194, 197, 224

[56] References Cited

U.S. PATENT DOCUMENTS

| | | | |
|---|---|---|---|
| 3,380,855 | 4/1968 | Mahy et al. | 429/194 X |
| 3,796,605 | 3/1974 | Dechenaux et al. | 136/6 LN |
| 3,960,595 | 6/1976 | Lehmann et al. | 136/6 LN |
| 4,118,334 | 10/1978 | Goebel | 429/194 X |
| 4,129,691 | 12/1978 | Broussely | 429/197 |

Primary Examiner—Charles F. LeFevour
Attorney, Agent, or Firm—Craig and Antonelli

[57] ABSTRACT

This invention relates to a non-aqueous electrolyte cell having an improved utilization of manganese dioxide. The utilization of manganese dioxide of a conventional non-aqueous electrolyte cell comprising a negative active material which comprises lithium, sodium or the like; a positive active material which comprises manganese dioxide; and a non-aqueous electrolyte can be greatly improved by limiting the particle sizes of manganese dioxide powder, carbon powder and optional binder powder contained in the positive mass to, respectively, up to 30 μm, up to 5 μm and up to 3 μm.

10 Claims, 8 Drawing Figures

NON-AQUEOUS ELECTROLYTE CELLS

BACKGROUND OF THE INVENTION

1. Field of the Invention

This invention relates to a non-aqueous electrolyte cell, and more particularly, it pertains an organic electrolyte cell comprising a light metal as negative active material; a positive mass comprising manganese dioxide powder, carbon powder and optionally binder powder; and an organic electrolyte consisting of a solution of an inorganic salt of a metal corresponding to the light metal used as the negative active material in an organic solvent.

2. Description of Prior Art

Since an aqueous electrolyte cannot be used in a cell in which a light metal such as lithium, sodium or the like is used as negative active material, a non-aqueous electrolyte, namely a solution of an inorganic salt in an organic solvent is used. As the organic solvent, there is mainly used propylene carbonate, ethylene carbonate, tetrahydrofuran, acetonitrile or the like, and as the inorganic salt, there is used perchlorate, borofluoride or the like of lithium, sodium or the like. As the positive active material, there is used a metal oxide, halide, perchlorate or the like, among which manganese dioxide is preferable because when it is used as the positive active material, the discharge voltage is flat in relation to the discharge time, and the manganese dioxide is more stable against the organic electrolyte and lower in cost than the others. Accordingly, manganese dioxide is an excellent positive active material. Manganese dioxide has a resistivity of $3.5 \times 10^2$ to $4.2 \times 10^3$ ohm.cm, and hence, the electrical conductivity thereof is low. Thus, when manganese dioxide is used as the positive active material, it is necessary to blend therewith an electrically conductive material and if necessary a binder for bonding the two (Japanese Pat. No. 25,571/74). As the electrically conductive material, there is used a metal powder or carbon powder, and in order to make the weight of cell light and reduce the cost of cell, carbon powder is preferred. As the binder, there should be used a material stable against the organic electrolyte, and polytetrafluoroethylene is preferred. In order for a cell to have a high efficiency, it is ideal that the manganese dioxide used as the positive active material is completely consumed for the electrochemical reaction during the discharge, but in conventional cells, the utilization of manganese dioxide is only about 70%.

As a result of extensive research, the present inventors have unexpectedly found that the low utilization of manganese dioxide in conventional cells results from large particle size of manganese dioxide powder used and also large particle sizes of carbon powder and binder blended with the manganese dioxide powder. In the conventional cells, the average particle sizes of the three powders are more than 40 $\mu$m, more than 15 $\mu$m and more than 10 $\mu$m, respectively. The present inventors have found that there is the upper limit as to the average particle sizes for obtaining a utilization of manganese dioxide of more than 93%.

SUMMARY OF THE INVENTION

An object of this invention is to provide an organic electrolyte cell free from the above-mentioned disadvantages of conventional cells and having an excellent discharge capacity.

Other objects and advantages of this invention will become apparent from the following description and the accompanying drawings.

According to this invention, there is provided an organic electrolyte cell comprising a light metal as negative active material; a mixture of a manganese dioxide powder (positive active material), a carbon powder (electrically conductive material) and optionally a polytetrafluoroethylene powder (binder) as positive mass; and an organic electrolyte which is a solution of an inorganic salt of a metal corresponding to the light metal used as negative active material in an organic solvent, characterized in that the manganese dioxide powder has an average particle size of up to 30 $\mu$m, the carbon powder has an average particle size of up to 5 $\mu$m, and the polytetrafluoroethylene powder has an average particle size of up to 3 $\mu$m.

DETAILED DESCRIPTION OF THE INVENTION

Figure 1:
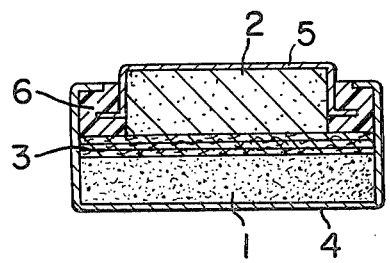
FIG. 1 shows a cross-sectional view of a cell of this invention.

In order to utilize most effectively the electric capacity possessed by manganese dioxide which is a positive active material, it is critical and essential that the manganese dioxide powder, the carbon powder and if used the polytetrafluoroethylene powder have average particle sizes of up to 30 $\mu$m, up to 5 $\mu$m and up to 3 $\mu$m, respectively, and only when these conditions are satisfied, the utilization of manganese dioxide reaches more than 93%.

The reason why the utilization of manganese dioxide is increased by satisfying the above-mentioned conditions is considered to be as follows: (1) Since the particles of the manganese dioxide powder used are small, electrochemical reaction can occur not only on the surface of powder but also at the center of powder. (2) Since the particles of the carbon powder are small, the powder can uniformly be mixed with the manganese dioxide powder, whereby the electrical conductivity of the positive mass is increased. (3) Since the particles of polytetrafluoroethylene powder used are small, the powder can uniformly be mixed with the manganese dioxide powder and the carbon powder, whereby the electrical resistance of the positive mass is made uniform and the particles are strongly bonded to one another. (4) Since the particle size of the manganese dioxide powder is small, the surface area of the powder becomes large, and hence, the surface for reaction is increased. (5) Since each powder is fine, the retension of the electrolyte in the positive mass is improved.

When the average particle sizes of the manganese dioxide powder, the carbon powder and the polytetrafluoroethylene powder are less than 0.1 μm, less than 0.05 μm and less than 0.01 μm, respectively, it becomes difficult to pack the positive electrode can with the positive mass. That is to say, the apparent specific gravity of the mass becomes small and hence the volume of the mass becomes great, for which it becomes impossible to pack the positive electrode can with a sufficient amount of the mass. Moreover, the bonding force between particles in the mass becomes weak, and therefore, the particles are not sufficiently bonded to one another even when the packing is effected under high pressure. Therefore, the average particle sizes of the three powders are preferably 0.1 to 30 μm, 0.05 to 5 μm, and 0.01 to 3 μm, respectively.

As the light metal constituting the negative active material, there may be used lithium, sodium, potassium, magnesium, calcium, aluminum or an alloy of these metals, among which lithium and an alloy of lithium and aluminum are preferred.

As the carbon powder, there may be used acetylene black powder, graphite powder or the like.

Although polytetrafluoroethylene powder is an optional component, it is preferable to use it because if it is not used the shape of the positive mass packed in the positive electrode can even under pressure is apt to be broken during the preparation of cell.

As the inorganic salt for the electrolyte, there may be used perchlorates and borofluoride of metals corresponding to the light metals used as the negative active material. Lithium perchlorate is preferred. As the organic solvent for the electrolyte, there may be used ethylene carbonate, propylene carbonate, 1,2-dimethoxyethane, γ-butyrolactone, tetrahydrofuran, dimethyl ether of diethylene glycol, acetonitrile or the like or a mixture thereof.

The manganese dioxide powder may be prepared and heat-treated in the conventional manner, for example, heat-treated at 250° C. or more. However, the heat-treatment of the manganese dioxide prepared at more than 350° C. gives a good result to the shelf life of the cell.

The proportions of the manganese dioxide powder, the carbon powder and the polytetrafluoroethylene powder in the positive mass are usually 65 to 95% by weight, 20 to 3% by weight and 15 to 2% by weight, respectively, and preferably 80 to 93% by weight, 10 to 4% by weight and 10 to 3% by weight, respectively, for obtaining a utilization of manganese dioxide of about 95% or more. When the polytetrafluoroethylene powder is not used, the proportions of the manganese dioxide powder and the carbon powder are 80 to 97% by weight and 20 to 3% by weight, preferably 90 to 96% by weight and 10 to 14% by weight, respectively.

DESCRIPTION OF THE PREFERRED EMBODIMENT

This invention is further illustrated by Examples, which are merely illustrative and not limitative.

EXAMPLE 1

In order to examine the effect of the particle size of manganese dioxide powder or discharge characteristics of a cell, manganese dioxide powders having average particle sizes of 0.1 μm, 5 μm, 30 μm, 50 μm, and 70 μm were used to prepare cells, and the discharge characteristics of these cells were tested in the conventional manner. The manganese dioxide powders were heat-treated at 380°±10° C. to remove water contained therein prior to use in the cells. As the conductive material, there was used carbon powder having an average particle size of 1 μm, and as the binder powder there was used polytetrafluoroethylene powder having an average particle size of 1 μm. The proportions of the three powders were 85% by weight of manganese dioxide powder, 8% by weight of carbon powder and 7% by weight of polytetrafluoroethylene powder.

A cell was prepared as shown in FIG. 1, in which 1 refers to a positive mass of manganese dioxide powder, carbon powder and polytetrafluoroethylene powder, and the positive mass was packed in an amount corresponding to an electrical capacity of 150 mAh. 2 refers to a negative active material consisting of lithium, and 3 to a separator consisting of a non-woven fabric of polypropylene fiber impregnated with an organic electrolyte prepared by dissolving lithium perchlorate in a mixed solvent of propylene carbonate and 1,2-dimethoxyethane (1:1 volume ratio) at a concentration of 1 mole/liter. 4 refers to a positive electrode can made of stainless steel, 5 to a negative electrode cap made of stainless steel, and 6 to a gasket made of polypropylene resin.

Figure 2:
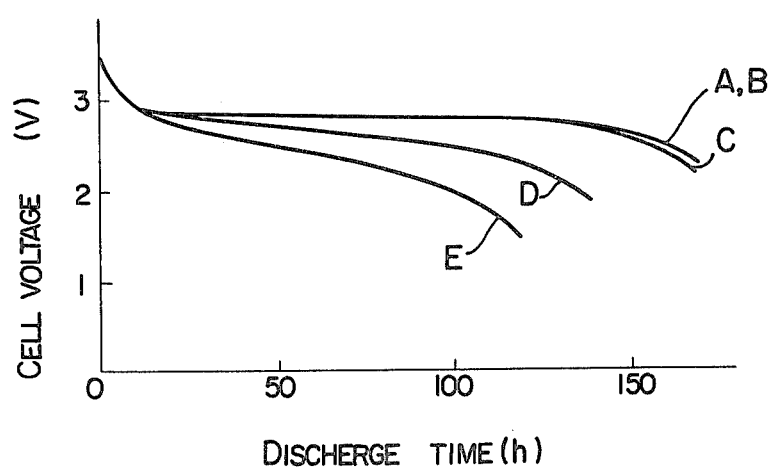
FIG. 2 is a graph showing the effect, on discharge characteristics of cell, of the particle size of manganese dioxide powder used as the positive active material.

In FIG. 2, there are shown discharge characteristics at a constant resistance of 3 killoohm of cells in which manganese dioxide powders havin the above-mentioned various average particle sizes are used as the positive active material. In FIG. 2, Curve A refers to the discharge characteristics of a cell in which the manganese dioxide powder has an average particle size of 0.1 μm, Curve B to the discharge characteristics of a cell in which the manganese dioxide powder has an average particle size of 5 μm, Curve C to the discharge characteristics of a cell in which the manganese dioxide powder has an average particle size of 30 μm, Curve D to the discharge characteristics of a cell in which the manganese dioxide powder has an average particle size of 50 μm, and Curve E to the discharge characteristics of a cell in which the manganese dioxide powder has an average particle size of 70 μm. As is clear from FIG. 2, when the average particle size of the manganese dioxide powder is within the range of 0.1 to 30 μm (i.e., Curves A to C), there is substantially no difference in discharge characteristics, and the utilization of manganese dioxide are 98%. When the average particle size is more than 30 μm, namely 50 μm and 70 μm, the discharge characteristics are greatly inferior, and the utilizations of manganese dioxide are less than 80%. This seems to be because when the average particle size of manganese dioxide powder is more than 30 μm, the electrochemical reaction does not occur at the center of the particles.

EXAMPLE 2

Figure 3:
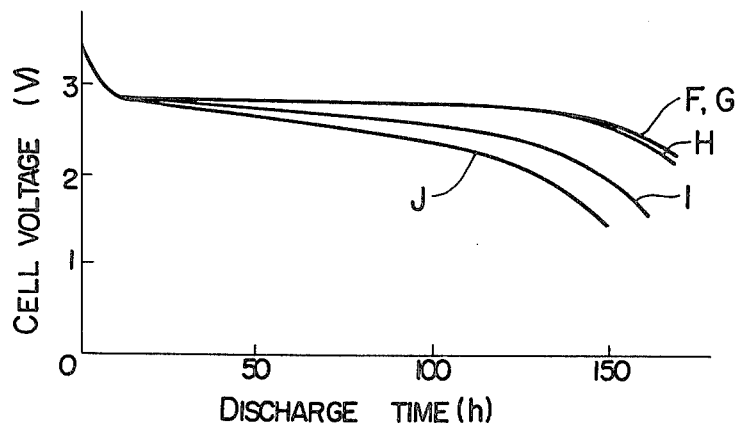
FIG. 3 is a graph showing the effect, on discharge characteristics of cell, of the particle size of carbon powder contained in the positive mass.

In this Example, the effect of the particle size of carbon powder used as electrically conductive material on the discharge characteristics was examined. Carbon powder having average particle sizes of 0.05 μm, 1 μm, 5 μm, 20 μm, and 40 μm were used. The manganese dioxide powder used had an average particle size of 5 μm, and the polytetrafluoroethylene powder used had an average particle size of 1 μm. A cell was prepared in the same manner as in Example 1, except that the above powders were used. The discharge characteristics at a constant resistance of 3 killoohm of the cells are shown in FIG. 3, in which Curve F refers to the carbon powder having an average particle size of 0.05 μm, Curve G to the carbon powder having an average particle size of 1 μm, Curve H to the carbon powder having an average particle size of 5 μm, Curve I to the carbon powder having an average particle size of 20 μm, and Curve J to the carbon powder having an average particle size of 40 μm. It can be seen from FIG. 3 that when the average particle size of the carbon powder is within the range of 0.05 μm to 5 μm (Curves F to H), there is substantially no difference in discharge characteristics, and the utilizations of manganese dioxide are 98%. However, when carbon powders having an average particle size larger than the above range are used, the discharge characteristics are inferior, and the utilizations of manganese dioxide are less than 80%. This seems to be because the amount of the carbon powder used in the positive mass is only 8% by weight and therefore it is insufficient to uniformly disperse the carbon powder in the positive mass when the carbon powder has a larger average particle size than 5 μm. Therefore, the internal resistance of the positive mass is different locally. When a carbon powder having an average particle size of 20 μm or more is used in a large amount, it is possible to lower the internal resistance of the positive mass, but in this case, the volume of the positive mass occupying in the cell is increased for obtaining the same capacity. Accordingly, in a cell having a given volume, it follows that the amount of manganese dioxide powder is reduced correspondingly, and hence, the energy density of the cell is decreased.

EXAMPLE 3

Figure 4:
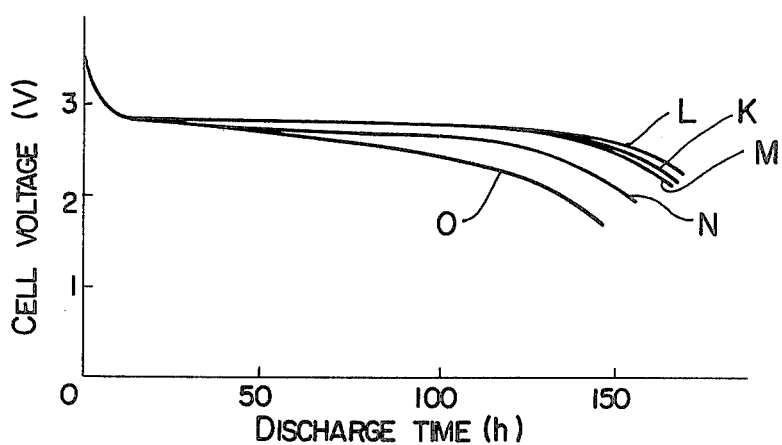
FIG. 4 is a graph showing the effect, on discharge characteristics of cell, of the particle size of polytetrafluoroethylene powder contained in the positive mass.

In this Example, the effect of the particle size of polytetrafluoroethylene powder used as binder was examined. The same procedure as in Example 1 was repeated, except that polytetrafluoroethylene powders having average particle sizes of 0.01 μm, 1 μm, 3 μm, 10 μm and 20 μm, a manganese dioxide powder having an average particle size of 5 μm and a carbon powder having an average particle size of 1 μm were used, to prepare cells. The discharge characteristics at a constant resistance of 3 killoohm of the cells thus prepared are shown in FIG. 4, in which Curve K refers to polytetrafluoroethylene powder having an average particle size of 0.01 μm, Curve L to that having an average particle size of 1 μm, Curve M to that having an average particle size of 3 μm, Curve N to that having an average particle size of 10 μm, and Curve O to that having an average particle size of 20 μm. It can be seen from FIG. 4 that when the average particle size of the polytetrafluoroethylene powder is within the range of 0.01 to 3 μm (Curves K to M), there is substantially no difference to discharge characteristics and the utilizations of manganese dioxide are more than 96%, but when the particle size is larger than said range, the discharge characteristics are inferior and the utilizations of manganese dioxide are less than 80%. This seems to be because when a polytetrafluoroethylene powder having a larger average particle size than 3 μm is used, a lump of polytetrafluoroethylene powder is formed in the positive mass, whereby the electric resistance is increased.

EXAMPLE 4

Figure 5:
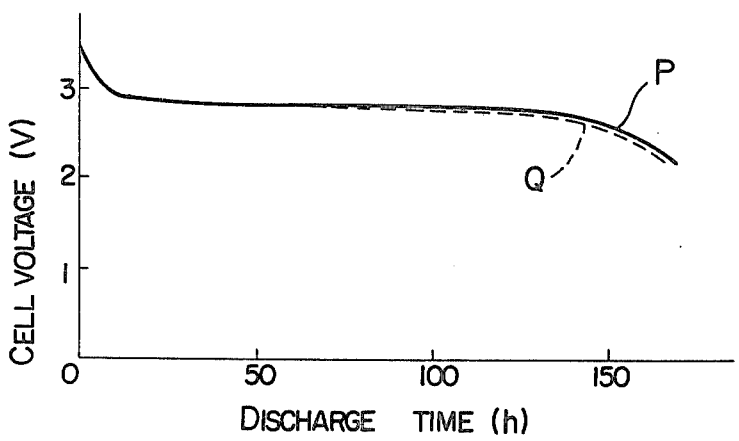
FIG. 5 is a graph showing comparison in discharge characteristics of cell between the case where polytetrafluoroethylene powder is used and the case where no polytetrafluoroethylene powder is used.

A cell was prepared in the same manner as in Example 1, except that a manganese dioxide powder having an average particle size of 5 μm and a carbon powder having an average particle size of 1 μm were used in a weight ratio of 92:8 without using the polytetrafluoroethylene powder. The discharge characteristics at a constant resistance of 3 killoohm of the cell is as shown as Curve Q in FIG. 5, in which the same curve as B in FIG. 2 is also indicated as Curve P for comparison.

EXAMPLE 5

Figure 6:
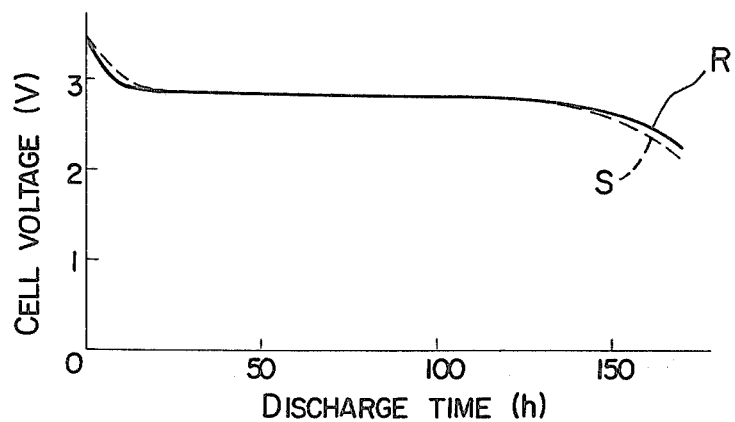
FIGS. 6 and 7 are graphs showing the effect of the temperature for heat-treatment of manganese dioxide powder on discharge characteristics immediately after the preparation of cell, and after storage for one year, respectively.

The same procesure as in Example 1 was repeated, except that a manganese dioxide powder having an average particle size of 5 μm which had been heat-treated at 300° C. was used, to prepare a cell. The discharge characteristics of the cell at a constant resistance of 3 killoohm immediately after the preparation of the cell is as shown as Curve S in FIG. 6, in which the same curve as Curve B in FIG. 2 is indicated as Curve R for comparison.

Figure 7:
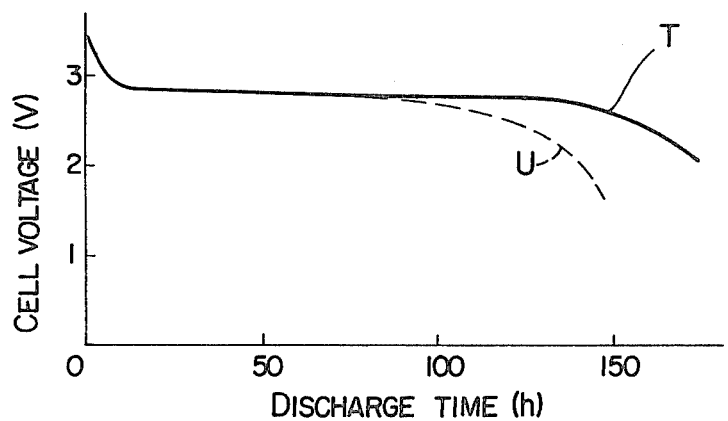

The discharge characteristics at a constant resistance of 3 killoohm of the cell after storage for one year is as shown as Curve U in FIG. 7, in which Curve T is the discharge characteristics of the cell of Curve B in FIG. 2 after storage for one year.

COMPARATIVE EXAMPLE

Figure 8:
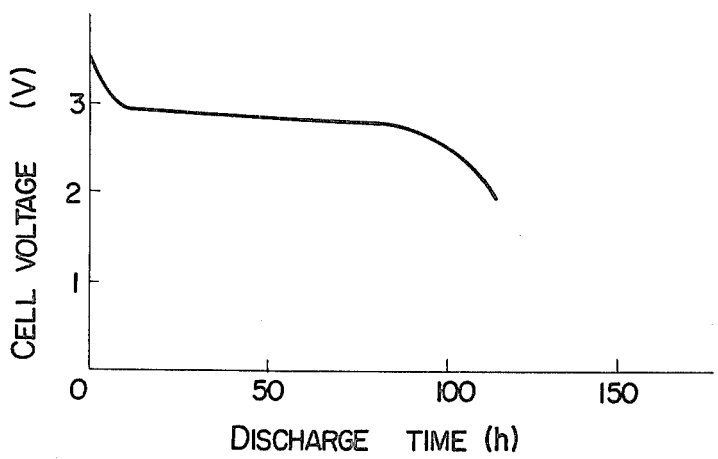
FIG. 8 is a graph of discharge characteristics of a cell in which manganese dioxide powder, carbon powder and polytetrafluoroethylene, each having a particle size outside the scope of this invention, are used as positive mass.

A cell was prepared in the same manner as in Example 1, except that a manganese dioxide powder having an average particle size of 40 μm which had been heat-treated at 300° C., a carbon powder having an average particle size of 15 μm and a polytetrafluoroethylene powder having an average particle size of 10 μm were used. These particle sizes are all outside the scope of this invention. The discharge characteristics at a constant resistance of 3 killoohm of the cell is as shown in FIG. 8.

What is claimed is:

1. An organic electrolyte cell comprising as negative active material a light metal selected from the group consisting of lithium, sodium, potassium, magnesium and aluminum or an alloy of said metals with one another; a mixture of 65 to 95% by weight of manganese dioxide powder, 20 to 3% by weight of carbon powder and 15 to 2% by weight of polytetrafluoroethylene powder as positive mass; and an organic electrolyte which is a solution of an inorganic salt of a metal corresponding to the light metal used as the negative active material in an organic solvent, characterized in that the manganese dioxide powder has an average particle size of up to 30 μm, the carbon powder has an average particle size of up to 5 μm and the polytetrafluoroethylene powder has an average particle size of up to 3 μm.

2. An organic electrolyte cell according to claim 1, wherein the manganese dioxide powder has an average particle size of 0.1 to 30 μm, the carbon powder has an average particle size of 0.05 to 5 μm and the polytetrafluoroethylene powder has an average particle size of 0.01 to 3 μm.

3. An organic electrolyte cell according to claim 1 or 2, wherein the amount of manganese dioxide powder is 80 to 93% by weight, the amount of carbon powder is 10 to 4% by weight, and the amount of polytetrafluoroethylene powder is 10 to 3% by weight in the mixture as positive material.

4. An organic electrolyte cell according to claim 1 or 2, wherein the light metal as negative active material is lithium or an alloy of lithium with aluminum.

5. An organic electrolyte cell according to claim 1 or 2, wherein the organic electrolyte is a solution of a perchlorate or borofluoride of a metal corresponding to the light metal in an organic solvent selected from the group consisting of ethylene carbonate, propylene carbonate, 1,2-dimethoxyethane, γ-butyrolactone, tetrahydrofuran, dimethyl ether of diethylene glycol, acetonitrile and a mixture thereof.

6. An organic electrolyte cell according to claim 6, wherein the organic electrolyte is a solution of lithium perchlorate in a mixture of propylene carbonate and 1,2-dimethoxyethane in a volume ratio of 1:1 at a concentration of 1 mole per liter.

7. An organic electrolyte cell according to claim 1 or claim 2 wherein the organic electrolyte is impregnated within a fibrous separator material.

8. An organic electrolyte cell according to claim 1 or claim 2, wherein the amount of manganese dioxide powder is 90 to 96% by weight and the amount of carbon powder is 10 to 4% by weight.

9. An organic electrolyte cell comprising as negative active material a light metal selected from the group consisting of lithium, sodium, potassium, magnesium, calcium and aluminum or an alloy of said metals with one another; a mixture of 80 to 97% by weight of manganese dioxide powder and 20 to 3% by weight of carbon powder as positive mass; and an organic electrolyte which is a solution of an inorganic salt of a metal corresponding to the light metal used as the negative active material in an organic solvent, characterized in that the manganese dioxide powder has an average particle size of up to 30 $\mu$m, and the carbon powder has an average particle size of up of 5 $\mu$m.

10. An organic electrolyte cell according to claim 9 wherein the manganese dioxide powder has an average particle size of 0.1 to 30 $\mu$m and the carbon powder has an average particle size of 0.05 to 5 $\mu$m.

* * * * *